United States Patent [19]

Smith

[11] Patent Number: 5,381,713

[45] Date of Patent: Jan. 17, 1995

[54] GLASS SCORING MECHANISM

[75] Inventor: Quinn C. Smith, Scotland, Canada

[73] Assignee: The Lockformer Company, Lisle, Ill.

[21] Appl. No.: 147,459

[22] Filed: Nov. 8, 1993

Related U.S. Application Data

[63] Continuation of Ser. No. 885,275, May 18, 1992, abandoned.

[51] Int. Cl.⁶ .................... B26D 3/08; C03B 33/10
[52] U.S. Cl. .......................... 83/881; 83/582; 83/886
[58] Field of Search ............. 83/886, 881, 879, 582, 83/584, 586; 225/96, 96.5; 30/164.95

[56] References Cited

U.S. PATENT DOCUMENTS

| | | | |
|---|---|---|---|
| 2,515,445 | 7/1950 | Gilstrap | 83/582 X |
| 3,280,676 | 10/1966 | Grzymislanwski | 83/881 |
| 3,742,794 | 7/1973 | Rupprecht et al. | 83/886 |
| 3,859,878 | 1/1975 | Bonaddio et al. | 83/881 |
| 4,226,153 | 10/1980 | Insolio | 83/886 X |
| 4,228,711 | 10/1980 | Insolio | 83/886 X |
| 4,291,824 | 9/1981 | DeTorre | 83/881 X |
| 4,541,176 | 9/1985 | Croce | 83/886 X |
| 4,624,169 | 11/1986 | Nelson | 83/881 |
| 4,678,457 | 7/1987 | Slobodkin | 83/881 X |
| 4,934,236 | 6/1990 | Gordon | 83/582 X |
| 5,038,654 | 8/1991 | Mackey | 83/881 X |

FOREIGN PATENT DOCUMENTS

| | | | |
|---|---|---|---|
| 1377060 | 12/1974 | United Kingdom | 83/879 |
| 2124612 | 2/1984 | United Kingdom | 83/879 |
| 356253 | 12/1972 | U.S.S.R. | 83/881 |
| 990694 | 1/1983 | U.S.S.R. | 83/886 |

Primary Examiner—Rinaldi I. Rada
Assistant Examiner—Clark F. Dexter
Attorney, Agent, or Firm—Jones, Day, Reavis & Pogue

[57] ABSTRACT

A glass scoring machine includes a table and a numerically controlled carriage for movement over the table along X and Y axes. The glass scoring wheel is held against the sheet of glass by a pneumatic cylinder and a compression spring. In one embodiment, an adjustable stop is provided to establish the desired force applied to the glass by the scoring wheel depending on the thickness of the glass to be cut. In an alternate embodiment, the pneumatic cylinder is provided with a variable pressure regulator to establish the desired force at the scoring wheel.

17 Claims, 6 Drawing Sheets

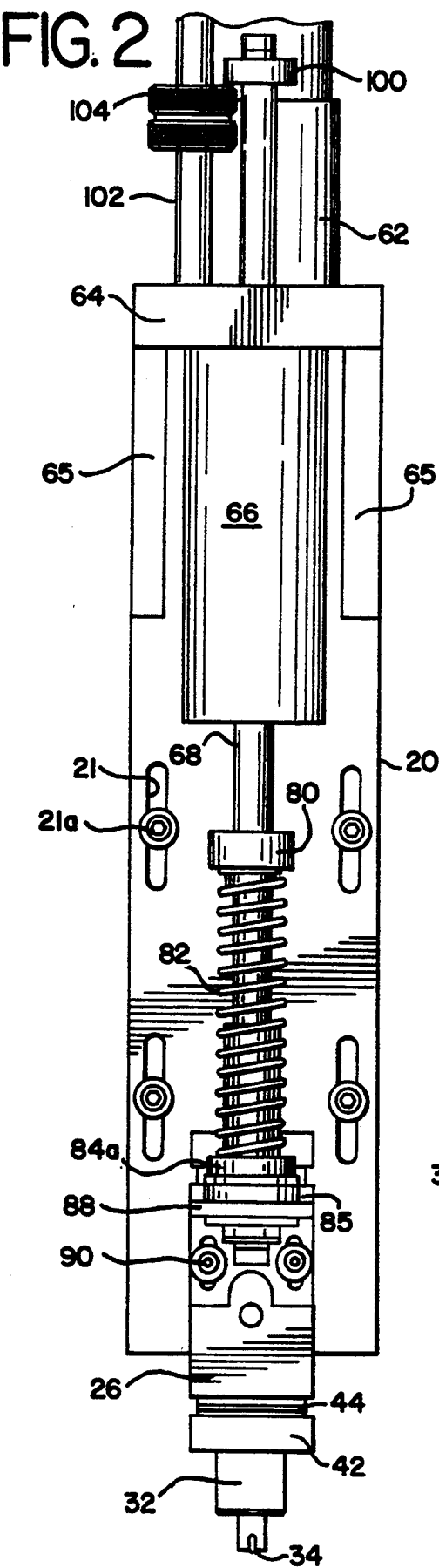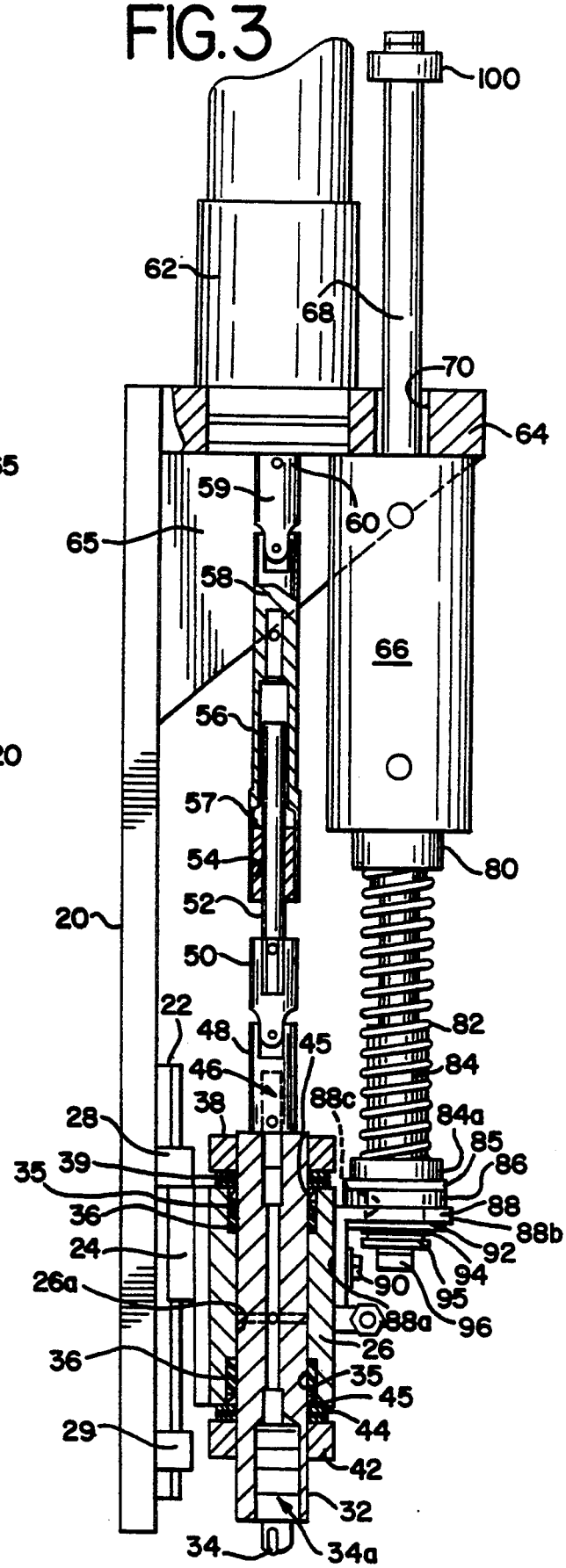
FIG. 2
FIG. 3

GLASS SCORING MECHANISM

This is a continuation of copending application Ser. No. 07/885,275 filed on May 18, 1992, now abandoned.

BACKGROUND OF THE INVENTION

The present invention relates to glass cutting or scoring machines, and in particular to the mechanism for holding the glass scoring wheel against the sheet to be cut. (The terms "score" and "cut" and their variants are used synonymously herein.) In actual practice, the glass is scored by a scoring wheel and then deformed (usually manually) for severing or breaking the glass sheet along the score lines.

Glass scoring machines of the type under consideration are provided with a table to support the sheet of glass to be cut. The table may be of the tiltable type shown in U.S. Pat. No. 3,570,733 to facilitate handling of the glass sheets which are usually of rather large size and are consequently rather heavy.

The scoring wheel is supported by a pillar post which is in turn supported over the table by a movable carriage. The carriage is numerically controlled and computer operated for movement along X and Y axes to score the glass along straight and curved paths. Representative prior art showing such machines are U.S. Pat. Nos. 4,171,657 and 4,709,483.

During operation of these scoring machines, the carriage remains in fixed vertical relationship with the table. Glass scoring machines of the type under consideration are normally provided with some form of a resilient or yieldable means for establishing the desired force between the scoring wheel and the surface of the glass sheet to be scored. Usually, either a spring or pneumatic system is employed to yieldably urge the scoring wheel against the glass surface. A prior art reference showing the pneumatic type of hold-down mechanism for a scoring wheel is U.S. Pat. No. 3,058,220.

As is known to those skilled in the art, the surface of the table used to support the glass sheet is not perfectly flat or planar. Normally, variations in the surface of the table will be in the range of plus or minus $\frac{1}{8}$ of an inch. The glass sheet (which itself is very flat and has a very uniform thickness) will tend to follow or adopt the surface contour of the table both because of the weight of the glass sheet and because of the force applied to the glass sheet by the scoring wheel. Thus, the distance between the carriage and the glass surface to be scored will vary as much as $\frac{1}{8}$ of an inch during a scoring operation. By way of reference, the depth of the score is usually about 1/1000 of an inch. Thus, to maintain consistency and uniformity in the depth of the score line, it is necessary to provide means for maintaining the desired force between the scoring wheel and the glass as the scoring wheel moves relative to the carriage to accommodate the undulating surface of the glass sheet.

SUMMARY OF THE INVENTION

The present invention provides new and improved means for maintaining the desired force between the scoring wheel and the undulating surface of the glass sheet during a scoring operation. In particular, the present invention provides a coacting adjustment means and a compression spring for forcing the scoring wheel against the glass sheet. In a preferred embodiment, the adjustment means is constituted by adjustable stop means to establish the desired spring force which in turn establishes the force at the scoring wheel. In an alternate embodiment, the adjustable stop means are not employed and a pneumatic cylinder with a variable pressure regulator is connected with the compression spring to establish the desired spring force.

DESCRIPTION OF THE DRAWINGS

FIG. 2 is a front view of a subassembly of the glass scoring machine which embodies a preferred embodiment of the present invention;

FIG. 3 is a side view of the subassembly of FIG. 2;

DESCRIPTION OF THE INVENTION

Figure 1:
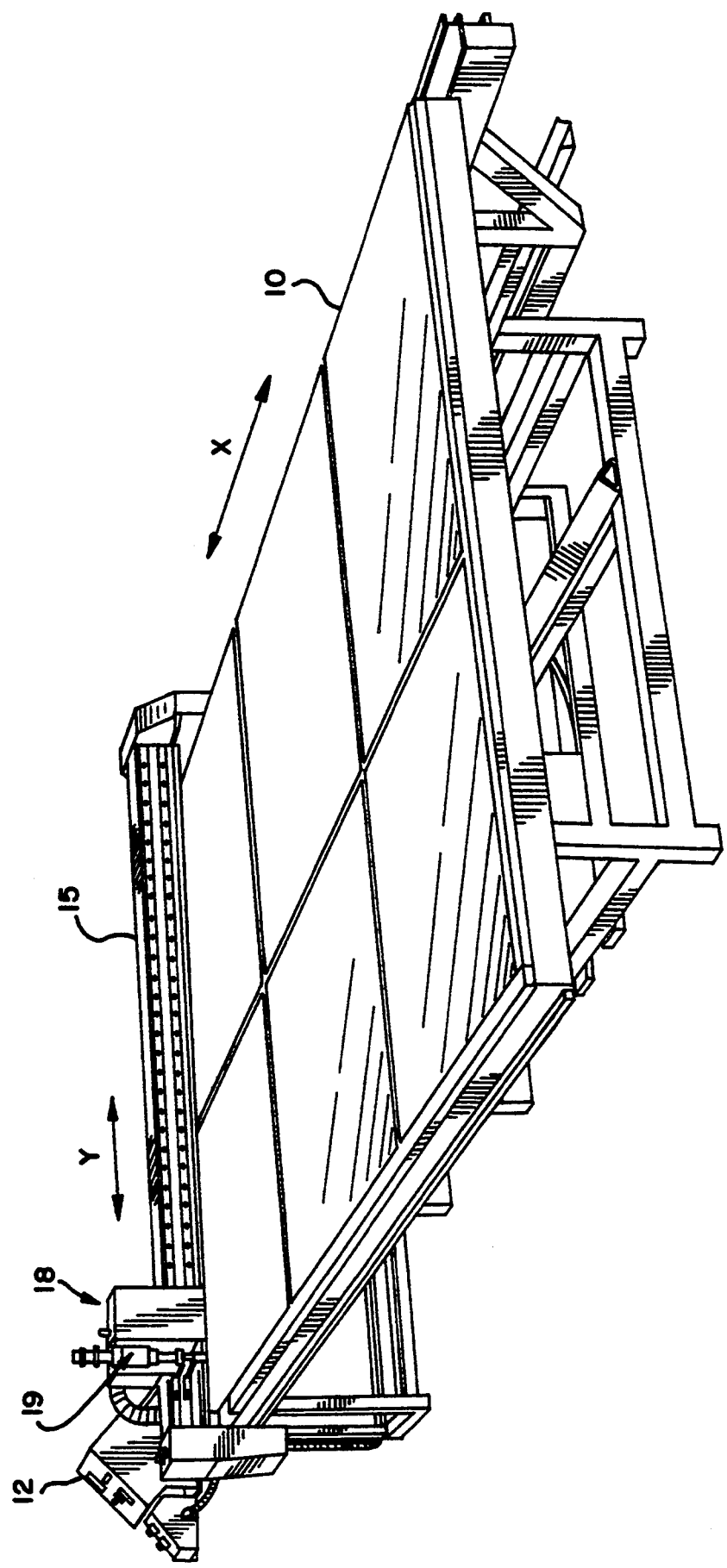
FIG. 1 is a perspective view of a glass scoring apparatus embodying the present invention.

Referring particularly to FIG. 1, a suitably supported platform or table 10 is shown with an associated control console 12. A bridge 15 extends across the table for movement along the "X" axis. A carriage assembly, generally designated 18, is mounted on the bridge 15 for movement along the "Y" axis. It will be understood that the bridge and carriage are driven by electric motors which are numerically controlled by a computer operable from the console 12 for moving the scoring wheel, hereinafter to be described, along straight and curved lines.

The carriage 18 mounts a cutting or scoring assembly generally designated 19. Referring now to FIGS. 2 and 3, the cutting assembly 19 includes a vertically disposed support plate 20. The support plate 20 includes a plurality of slots 21 receiving fasteners 21a which serve to permit the plate to be secured in the desired spaced relationship with the table 10. This spacing will depend, among other things, on the distance between the bridge 15 and the table.

The support plate 20 mounts a vertically oriented bearing guide 22 which is in slidable engagement with a linear block bearing 24, the latter being secured to the pillar post mounting block 26. The support plate 20 mounts upper and lower lugs 28 and 29, respectively, which are adapted to be abutted by the bearing block 24 for limiting vertical movement of the pillar post mounting block relative to the carriage support plate 20.

The pillar post mounting block 26, which has a rectangular cross section, includes a central bore 26a for rotatably mounting a pillar post holder 32, the latter in turn mounting a pillar post assembly 34a including the scoring wheel 34. The pillar post assembly and scoring wheel may be of well known construction and require no further description herein.

As noted particularly in FIG. 3, the pillar post mounting block includes annular recesses 35 receiving radial bushings 36 which engage the exterior surface of the pillar post holder 32 thereby mounting the latter for rotation about its vertical central axis, which may be referred to as a "Z" axis. An upper pillar post collar 38 is mounted to the pillar post holder and is separated from the mounting block by a thrust bearing assembly 39. A lower pillar post collar 42 is secured to the pillar post holder and is separated from the mounting block 26 by a thrust bearing assembly 44. Oil seal rings 45 are mounted between the bushings 36 and thrust bearings 39 and 44 to retain lubricating oil inside the pillar post mounting block 26.

The pillar post holder includes an extension 46 suitably connected to a universal joint member 48. The universal joint element 48 is connected to a like universal joint element 50 by a pair of pins; thus, the elements 48 and 50 constitute a conventional universal joint assembly.

The universal joint element 50 is connected to one end of a splined rod 52, the upper end of which is received within the enlarged portion of a blind bore 54 formed at the lower end of a sleeve 56. The rod 52 is received within a splined bushing 57 which is press fitted within the bore 54 of the cylindrical sleeve 56. It will be apparent that relative vertical movement is permitted between the rod 52 and the sleeve 56 and that rotation of the sleeve 56 will be imparted to the rod 52 by the splined connection just described.

The upper end of the sleeve 56 is suitably connected with a universal joint element 58, the latter being connected by a pair of pins to another universal joint element 59. Again, the elements 58 and 59 cooperate to form a conventional universal joint.

The universal joint element 59 is connected to the output shaft 60 of an electric motor 62, the latter being mounted to a bracket 64. The bracket 64 is suitably supported from the support plate 20 by gusset plates 65. It will be apparent that the electric motor 62 is provided to rotate the pillar post holder about its vertical axis. Of course, the electric motor 62 is numerically controlled by the computer to rotate the pillar post holder as appropriate depending on movement of the carriage along the "X" and "Y" axes.

A pneumatic cylinder 66 has its upper end secured to the underside of the bracket 64. The pneumatic cylinder 66, which is of conventional construction, includes a piston (not shown) secured to a piston rod 68 which extends exteriorly of the cylinder 66 at both ends thereof. To this end, the bracket 64 is provided with an opening 70 to permit free movement of the piston rod 68 in a reciprocal fashion along its vertical central axis.

Figure 7:
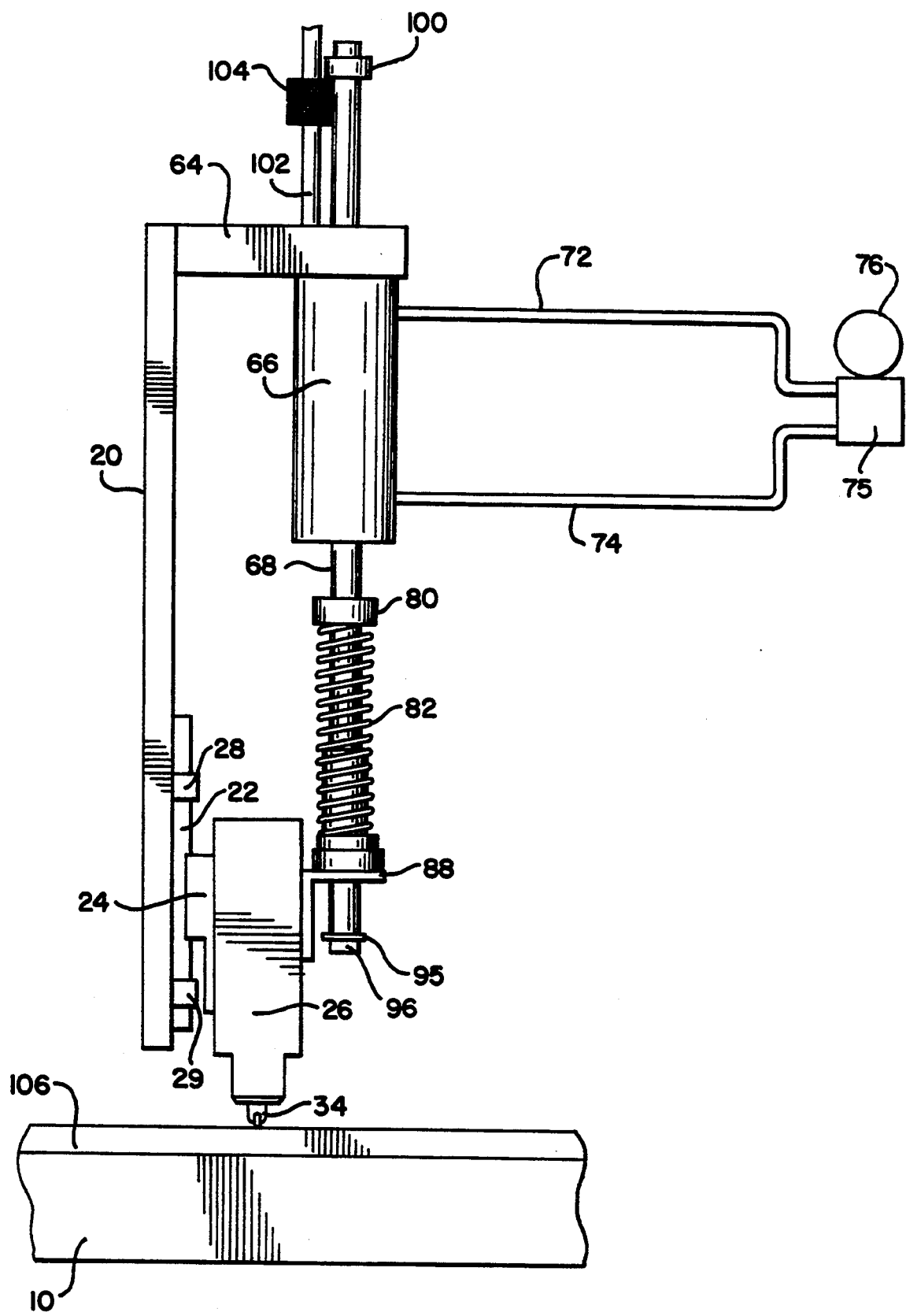
FIG. 7 is a diagramatic view of the preferred embodiment of the present invention.

Referring momentarily to FIG. 7, conduits 72, 74 have corresponding ends in communication with the cylinder 66 at opposed faces of the piston. Conduits 72 and 74 are connected to an appropriate air valve 75 associated with a compressor 76. Again, the pneumatic system is of conventional construction and requires no detailed description herein.

Returning now to FIGS. 2 through 5, it will be seen that a collar 80 is fixed to the piston rod 68 adjacent the portion of the latter which extends from the lower end of the cylinder 66. The collar 80 engages one end of a helical round-wire compression spring 82, the latter being in coaxial telescoping relationship with the lower portion of the piston rod 68. The lower end of the compression spring 82 engages an annular formation 84a integral with a sliding collar 84. The collar 84 has a central longitudinal bore 84b (FIG. 6) which slidably receives the piston rod 68. It will be understood that the collar 84 is mounted on the piston rod 68 for axial (vertical in the embodiment shown for purposes of illustration) movement relative to the piston rod.

The underside of the annular formation 84a is arranged for abutting engagement with the upper surface of a convex washer 85, the latter having a central opening for receiving the cylindrical portion 84c of the collar 84. The convex washer 85 is in engagement with a concave washer 86 which also has a central opening for receiving the cylindrical portion 84c of the collar 84.

It should be noted that a generally right angle bracket 88 is mounted to the pillar post mounting block. To this end, one leg 88a of the bracket is secured to the pillar post mounting block 26 by suitable fasteners 90. The upper face of the other leg 88b of this bracket is engaged by the lower surface of the concave washer 86. The leg 88b is provided with an opening 88c for freely receiving the cylindrical portion 84c of the collar 84. A flat washer 92 is held in place on the cylindrical portion 84c of the collar 84 by a C-clip 94 received within an annular recess 84d formed in the collar 84 adjacent its lower end 84e. It should be pointed out that the annular recess 84d is spaced from the underside of the annular formation 84a such that a small clearance, e.g., 1/16th of an inch, is provided between the washer 92 and the underside of the bracket leg 88b. This clearance space, coupled with the inter-engagement between the washers 85, 86, will permit the washer 86 to seat itself against the bracket leg 88b even though the piston rod 68 is not perfectly perpendicular to a plane containing the bracket leg 88b. In this regard, it will be appreciated that it is almost impossible to construct the foregoing subassembly with the bearing guide 22 in perfect parallel relationship with the axis of the piston rod 68. Thus, the various clearances just described, in combination with the washers 85, 86, prevent binding of any of the parts, particularly binding between the bearing guide and the pillar post mounting block 26.

The piston rod 68 includes a blind bore 68a for clamping a washer 95 at the end of the piston rod by means of a fastener 96. During upward movement of the piston rod, the washer 95 will come into engagement with the end 84e of the collar 84. Continued upward movement of the piston rod 68 will then bring the C-clip 94 into contact with the washer 92 causing the latter to come into engagement with the bracket leg 88b for lifting of the pillar post holder and assembly.

An adjustment washer 100 is fixed to the upper end of the piston rod 68. Referring to FIG. 2, it will be seen that the bracket 64 mounts an adjustment post 102 which is threaded and which is in threading engagement with a knurled adjustment nut 104. (The adjustment post 102 and adjustment nut 104 are not shown in FIG. 3 for purposes of better illustration of the piston rod 68.) It will be understood that rotation of the adjustment nut 104 will cause it to move up and down the post 102 depending on the direction of rotation of the adjustment nut. (The adjustment nut 104 may be formed in two sections such that the two sections can be rotated in opposite directions relative to each other to facilitate locking of the nut 104 in its desired location.) Preferably, suitable indicia means (not shown) are mounted to the bracket 64 adjacent the post 102 to facilitate positioning of the adjustment nut 104 in its desired vertical position.

As noted in FIG. 2, the washer 100 and adjustment nut 104 are sized and arranged such that they will engage each other upon the downward movement of the piston rod 68 and washer 100. Thus, the adjustment nut 104 constitutes a vertical stop to limit downward movement of the piston rod 68 and the spring collar 80 affixed thereto. The operation of the preferred embodiment just described is as follows.

Figure 5:
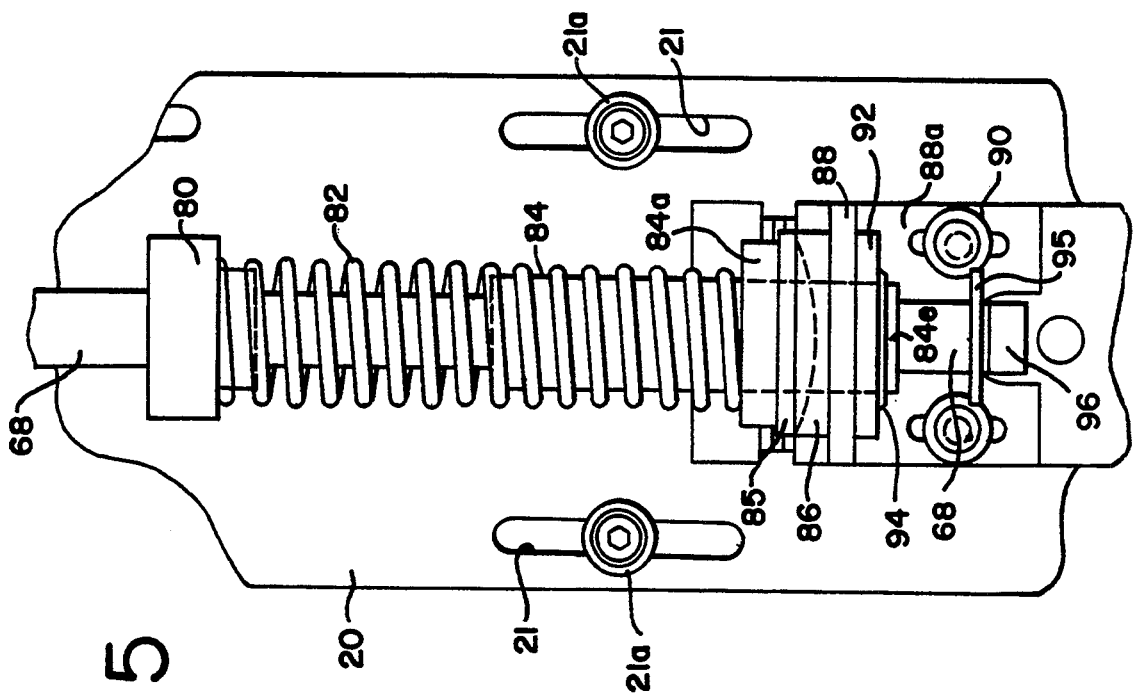
FIG. 5 is an enlarged fragmentary front view similar to FIG. 4 but showing certain of the parts in a relationship different from that of FIG. 4.
Figure 4:
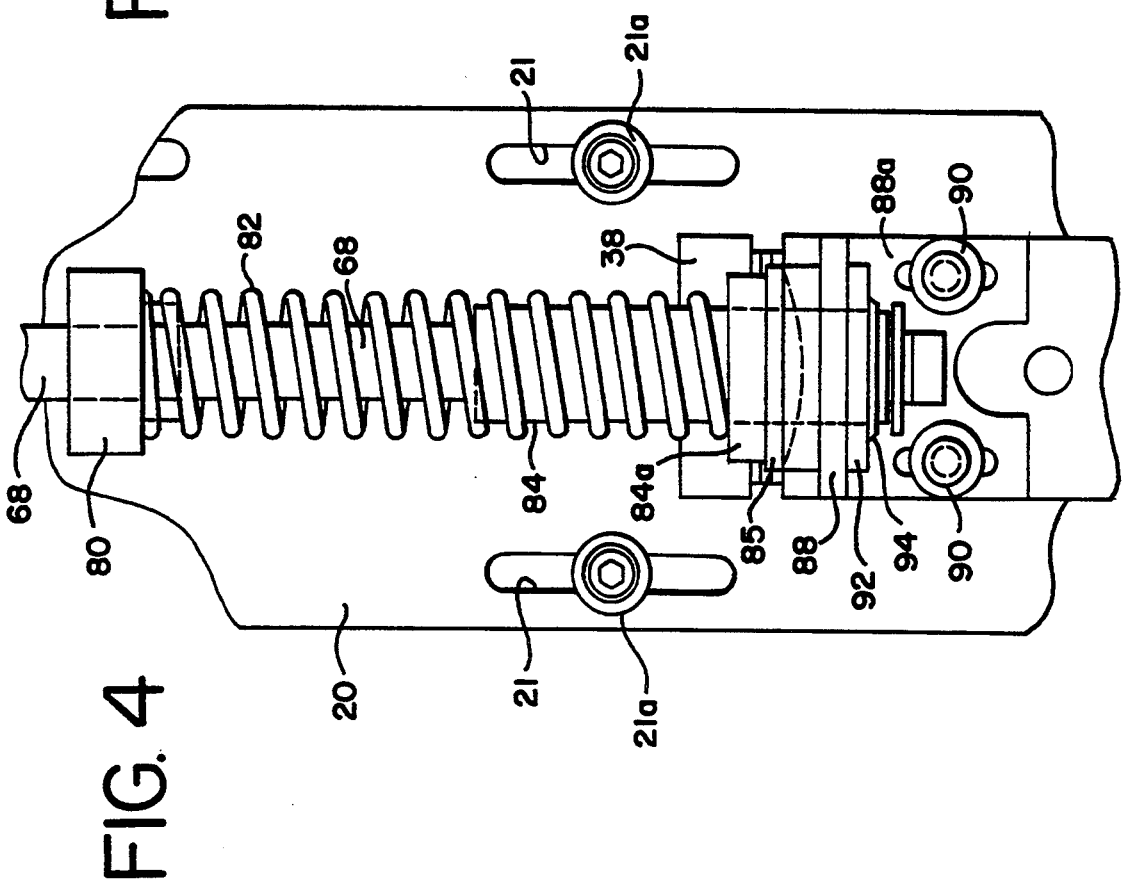
FIG. 4 is an enlarged fragmentary front view of the subassembly.
Figure 6:
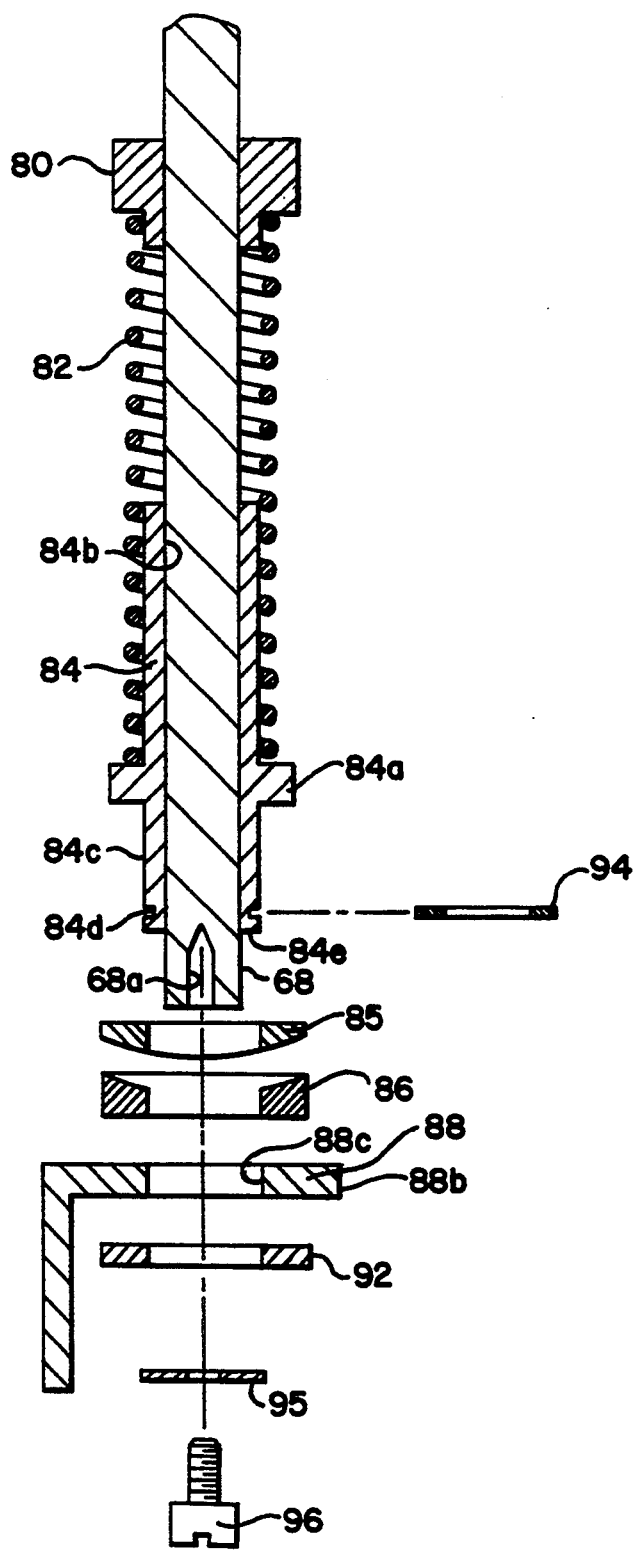
FIG. 6 is an exploded view of the parts shown in FIGS. 4 and 5.

The adjustable knob 104 is positioned depending on the thickness of the glass 106 to be cut and also depending on the required cutting force to be applied to the glass. The pneumatic cylinder 66 is then actuated for lowering the piston rod. During initial downward movement of the piston rod, the scoring wheel 34 will come into engagement with the surface of the glass to be scored. After the scoring wheel comes into engagement with the glass, further downward movement of the mounting block 26 is no longer possible except to the extent that the scoring wheel penetrates the glass in the amount of approximately 1/1000 of an inch as referred to above. Further downward movement of the collar 84 will no longer be possible because of the engagement between the annular formation 84a and the bracket 88a through the engagement of the washers 85, 86 as explained above. The piston rod 68 will continue its downward movement until the washer 100 comes into engagement with the adjustable stop knob 104. This further downward movement of the piston rod and the collar 80 will serve to compress the spring 82 to establish the requisite cutting force between the cutting wheel and the glass 106. When the washer 100 is brought into engagement with the knob 104, the washer 95 secured to the piston rod, will be in spaced relation with the lower end of the slide collar 84e as seen in FIG. 5. Consequently, it is seen that the pneumatic cylinder including the collar 80 serves as a powered variable adjustment mechanism for compressing the spring 82 to establish a selected one of a number of force values in yieldably holding the scoring wheel in engagement with the glass sheet.

Thus, it will be apparent that during a scoring operation, the spring 82 will permit the scoring wheel to move vertically over the undulating glass 106 surface while at the same time maintaining the proper force between the scoring wheel and the glass surface to achieve a uniform depth of score. Since the forces developed by the spring 82 are not constant in nature, the spring force will change as the spring contracts and expands during a scoring operation. However, these changes in the spring force have a minimal and negligible effect on the depth of score as the amount of contraction and expansion of the spring is small compared to the overall length of the spring. In one embodiment of the invention, when the spring was compressed to the desired degree, the distance between collar 80 and the pillar formation 84a was approximately three inches. The ¼ inch stroke of movement of the sliding collar 84 during its scoring operation produced negligible effects on the scoring force at the scoring wheel 34 and a uniform depth of score was maintained.

When a glass sheet 106 of a different thickness is to be scored, it is only necessary to adjust the knob 104 upwardly or downwardly to achieve the desired force at the scoring wheel. Of course, when it is desired to move the scoring wheel 34 away from the glass, the lower portion of the pneumatic cylinder 66 is pressurized to lift the piston and piston rod 68. When the upwardly moving washer 95 comes into engagement with the end 84e of the slide collar 84, the pillar post assembly 34a will be lifted and thus the scoring wheel 34 will be separated from the glass.

Figure 8:
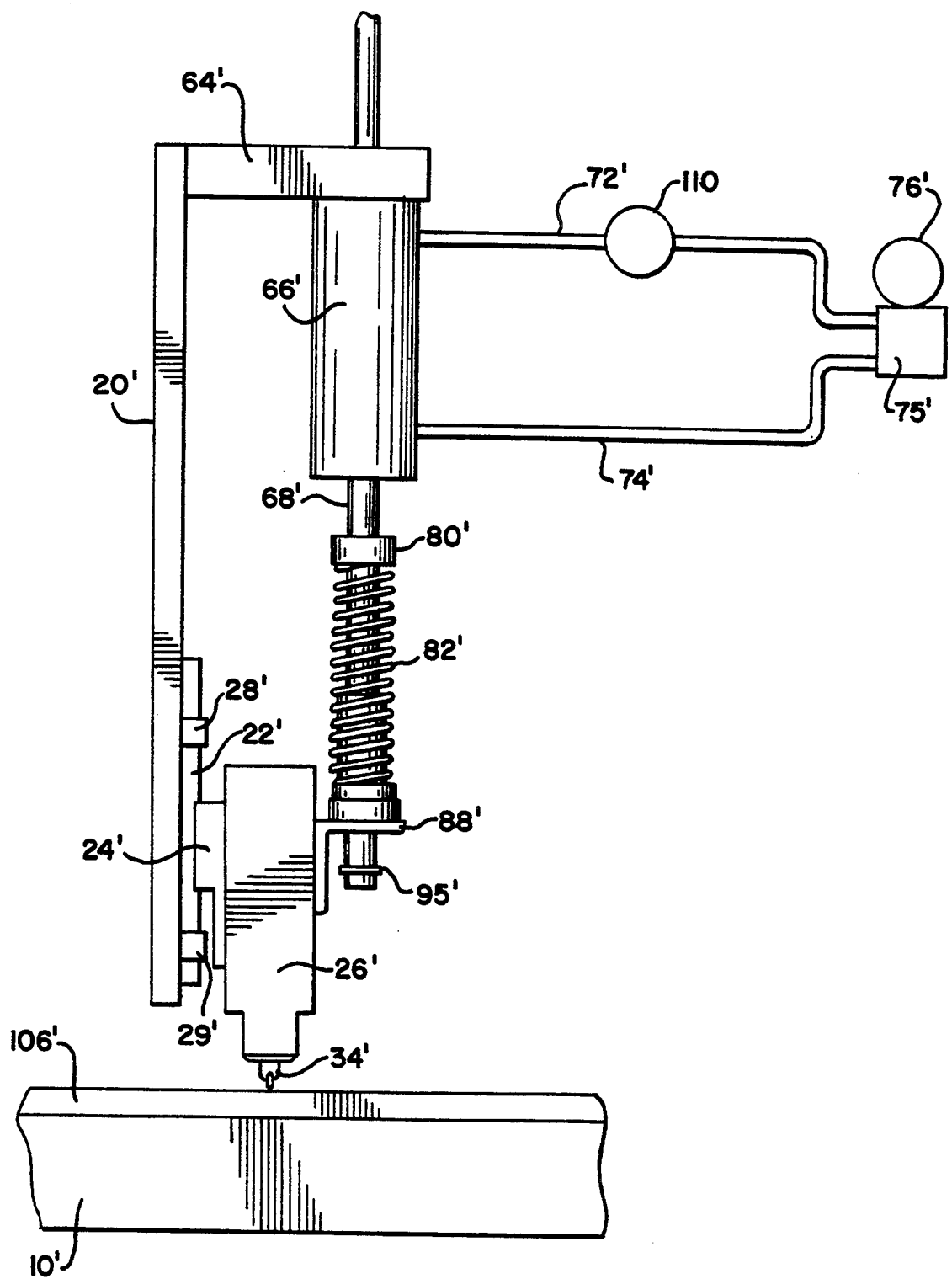
FIG. 8 is a diagramatic view of an alternate embodiment of the invention.

Referring now to the alternate embodiment shown diagramatically in FIG. 8, the parts corresponding to the parts of the preferred embodiment of FIGS. 1–7 are designated by the prime form of numeral. The alternate embodiment differs from the preferred embodiment in that the former does not require the adjustable stop constituted by the members 100, 102 and 104. The alternate embodiment differs further in the addition of a pressure regulator 110 connected in the conduit 72' between pneumatic cylinder 66' and the air compression source 75'. According to the alternative embodiment, the pressure regulator is varied and set to establish the vertical position of the spring collar 80' which will in turn compress the spring 82' to achieve the desired spring force. Again the spring force will establish the force at the scoring wheel 34'.

In the use of the alternative embodiment, a very significant advantage is achieved in that it is not necessary to make an adjustment at the pressure regulator 110, or any other adjustment for that matter, to maintain a uniform cutting force when accommodating glass sheets 106 of varying thicknesses. Since the piston rod 68' is not fixed or locked in place, as is the case with the embodiment of FIGS. 1-7, after the scoring wheel 34' is brought into engagement with the glass sheet 106, the collar 80' will seek an equilibrium position as determined by the downward force of the piston rod 68' and the upward force developed by the spring 82'. Because it is not practical to develop an air cylinder with sufficiently low break-away resistance to respond to thickness variations in the glass, the piston rod 68' will not move and the spring 82' will expand and compress to maintain an adequate cutting force as the scoring wheel 34' travels over the undulating glass surface. Again, since the spring 82' is not constant the force at the scoring wheel will change slightly as the spring expands and compresses; these changes in force are minimal and do not materially affect the depth of the score.

Both of the embodiments of the invention as disclosed herein have been described as scoring a glass sheet supported in a horizontal position. It will be appreciated that each of the embodiments of the invention will operate in the manner described herein when scoring a glass sheet in a vertical or inclined position.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the following claims.

I claim:

1. In a glass scoring apparatus of the type including a table for supporting a sheet of glass to be scored, a carriage and means mounting the carriage in predetermined spaced relationship with the table and for movement along X and Y axes, the improvement comprising:
   (a) a pillar post assembly mounting a glass scoring wheel;
   (b) guide means supported by the carriage and mounting the pillar post assembly for relative linear movement toward and away from the glass to be scored;
   (c) spring means acting on said pillar post assembly for yieldably urging the glass scoring wheel into engagement with a sheet of glass supported by the table, said spring means serving as the sole biasing means engaged with the pillar post assembly for urging the same against the glass;
   (d) powered variable adjustment means supported only by the carriage and engaged with said spring means for adjusting a cutting force on said scoring wheel after engagement of the scoring wheel with the glass such that the cutting force is increased by compressing the spring means, to establish a selected one of a number of force values when said variable adjustment means is operated in a first direction; and (e) said powered variable adjustment means further including lifting means arranged for acting on said pillar post assembly, such that operation of said adjustment means in a second direction opposite said first direction lifts the scoring wheel away from and out of engagement with the sheet of glass.

2. The improvement according to claim 1 wherein said variable adjustment means comprises:
(a) a member mounted by the carriage and engaged with said spring means for movement in said first and second directions for increasing and decreasing the spring force, respectively; and
(b) adjustable stop means connected to said member for establishing a limit position of the latter.

3. The improvement according to claim 2 wherein said variable adjustment means includes pneumatic means for moving said member in said first and second directions.

4. The improvement according to claim 1 further defined by:
(a) said spring means being in the form of a helical compression spring having one end thereof connected with support means engaged with said pillar post assembly;
(b) said adjustment means including a pneumatically operated piston and cylinder having a piston rod a portion of which is disposed exteriorly of said cylinder and coaxially received within said compression spring;
(c) said adjustment means also including a collar mounted on said piston rod portion and engaged with the other end of said compression spring; and
(d) said adjustment means further including first and second stop elements, said first stop element being connected to said piston rod for movement therewith, said second stop element being adjustably movable and mounted by the carriage for being engaged by said first stop element to limit the amount of movement of said collar toward the sheet to be scored.

5. The improvement according to claim 4 wherein the pillar post assembly and said piston rod are in a substantially parallel offset relationship and wherein said support means includes compensating means to prevent binding between the pillar post assembly and the guide means when the piston rod is not in true parallel relationship with the pillar post assembly.

6. The improvement according to claim 4 wherein a lifting collar is mounted to said piston rod portion.

7. The improvement according to claim 1 wherein said adjustment means comprises:
(a) an adjustable member mounted by the carriage and engaged with said spring means for movement in said first and second directions for increasing and decreasing the spring force, respectively;
(b) a pneumatically operated piston and cylinder assembly connected to said adjustable member; and
(c) variable pressure regulator means operatively connected with said piston and cylinder assembly for varying the spring force of said spring means.

8. The improvement according to claim 7 further defined by:
(a) said spring means being in the form of a helical compression spring having one end thereof connected with support means engaged with said pillar post assembly;
(b) said piston and cylinder assembly including a piston rod having a portion thereof received within said compression spring; and
(c) said adjustment means including a collar mounted on said piston rod and engaged with the other end of said compression spring.*

* Although this claim has not been amended, we are repeating the claim in this amendment for continuity purposes.

9. The improvement according to claim 8 wherein said pillar post assembly and said piston rod are in a substantially parallel offset relationship and wherein said support means includes compensating means to prevent binding between the pillar post assembly and the guide means when the piston rod is not in true parallel relationship with the pillar post assembly.

10. In a glass scoring apparatus of the type including a table for supporting a sheet of glass to be scored, a carriage and means mounting the carriage in predetermined spaced relationship with the table and for movement along X and Y axes, the improvement comprising:
(a) a pillar post assembly mounting a glass scoring wheel;
(b) guide means supported by the carriage and mounting the pillar assembly for relative linear movement toward and away from the glass to be scored;
(c) spring means acting on said pillar post assembly for yieldably urging the glass scoring wheel into engagement with a sheet of glass supported by the table;
(d) said spring means being in the form of a helical compression spring having one end thereof connected with support means engaged with said pillar post assembly;
(e) adjustment means engaged with said spring means for compressing the spring means after the scoring wheel engages the glass to establish a spring force of a selected value;
(f) said adjustment means including a pneumatically operated piston and cylinder having a piston rod with a portion disposed exteriorly of said cylinder and coaxially received within said compression spring;
(g) said adjustment means also including a collar mounted on said piston rod portion and engaged with the other end of said compression spring;
(h) said adjustment means further including first and second stop elements, said first stop element being connected to said piston rod for movement therewith, said second stop element being adjustably movable and mounted by the carriage for being engaged by said first stop element to limit the amount of movement of said collar toward the sheet to be scored;
(i) said pillar post assembly and said piston rod being in substantially parallel offset relationship; and
(j) wherein said support means includes compensating means to prevent binding between the pillar post assembly and the guide means when the piston rod is not in true parallel relationship with the pillar post assembly.

11. The improvement according to claim 10 wherein said support means includes a sliding collar mounted on said piston rod for axial movement relative thereto.

12. The improvement according to claim 11 wherein said compensating means includes interengaging convex and concave washers mounted on said sliding collar.

13. In a glass scoring apparatus of the type including a table for supporting a sheet of glass to be scored, a carriage and means mounting the carriage in predetermined spaced relationship with the table and for movement along X and Y axes, the improvement comprising:
   (a) a pillar post assembly mounting a glass scoring wheel;
   (b) guide means supported by the carriage and mounting the pillar post assembly for relative linear movement toward and away from the glass to be scored;
   (c) spring means attached to said pillar post assembly for yieldably urging the glass scoring wheel into engagement with a sheet of glass supported by the table;
   (d) said spring means being in the form of a helical compression spring having one end thereof connected with support means engaged with said pillar post assembly;
   (e) adjustment means engaged with said spring means for compressing the spring means after the scoring wheel engages the glass to establish a spring force of a selected value;
   (f) said adjustment means including an adjustable member mounted by the carriage and engaged with said spring means for movement in first and second directions for increasing and decreasing the spring force, respectively;
   (g) a pneumatically operated piston and cylinder assembly connected to said adjustable member;
   (h) variable pressure regulator means connected with said piston and cylinder assembly for varying the spring force of said spring means;
   (i) said piston and cylinder assembly including a piston rod having a portion thereof received within said compression spring;
   (j) said adjustment means including a collar mounted on said piston rod and engaged with the other end of said compression spring;
   (k) said pillar post assembly and said piston rod being in substantially parallel offset relationship; and
   (l) wherein said support means includes compensating means to prevent binding between the pillar post assembly and said guide means when the piston rod is not in true parallel relationship with the pillar post assembly.

14. The improvement according to claim 13 wherein said support means includes a sliding collar mounted on said piston rod for axial movement relative thereto.

15. The improvement according to claim 14 wherein said compensating means includes interengaging convex and concave washers mounted on said sliding collar.

16. In a glass scoring apparatus of the type including a table for supporting a sheet of glass to be scored, a carriage and means mounting the carriage in predetermined spaced relationship with the table and for movement along X and Y axes, the improvement comprising:
   (a) a pillar post assembly mounting a glass scoring wheel;
   (b) guide means supported by the carriage and mounting the pillar post assembly for relative linear movement toward and away from the glass to be scored;
   (c) spring means attached to said pillar post assembly for yieldably urging the glass scoring wheel into engagement with a sheet of glass supported by the table;
   (d) adjustment means supported only by the carriage and engaged with said spring means for compressing the spring means after the scoring wheel engages the glass to establish a spring force of a selected value, wherein said spring means serves as the sole means urging said scoring wheel into engagement with the sheet of glass;
   (e) said spring means being in the form of a helical compression spring having one end thereof connected with support means engaged with said pillar post assembly;
   (f) said adjustment means including a pneumatically operated piston and cylinder having a piston rod a portion of which is disposed exteriorly of said cylinder and coaxially received within said compression spring;
   (g) said adjustment means also including a collar mounted on said piston rod portion and engaged with the other end of said compression spring;
   (h) said adjustment means further including first and second stop elements, said first stop element being connected to said piston rod for movement therewith, said second stop element being adjustably movable and mounted by the carriage for being engaged by said first stop element to limit the amount of movement of said collar toward the sheet to be scored; and
   (i) said pillar post assembly and said piston rod being in substantially parallel offset relationship and said support means including compensating means to prevent binding between the pillar post assembly and the guide means when the piston rod is not in true parallel relationship with the pillar post assembly.

17. In a glass scoring apparatus of the type including a table for supporting a sheet of glass to be scored, a carriage and means mounting the carriage in predetermined spaced relationship with the table and for movement along X and Y axes, the improvement comprising:
   (a) a pillar post assembly mounting a glass scoring wheel;
   (b) guide means supported by the carriage and mounting the pillar post assembly for relative linear movement toward and away from the glass to be scored;
   (c) spring means attached to said pillar post assembly for yieldably urging the glass scoring wheel into engagement with a sheet of glass supported by the table;
   (d) adjustment means supported only by the carriage and engaged with said spring means for compressing the spring means after the scoring wheel engages the glass to establish a spring force of a selected value, wherein said spring means serves as the sole means urging said scoring wheel into engagement with the sheet of glass;
   (e) an adjustable member mounted by the carriage and engaged with said spring means for movement in first and second directions for increasing and decreasing the spring force, respectively;

(f) a pneumatically operated piston and cylinder assembly connected to said adjustable member;

(g) variable pressure regulator means operatively associated with said piston and cylinder assembly for varying the spring force of said spring means;

(h) said spring means being in the form of a helical compression spring having one end thereof connected with support means engaged with said pillar post assembly;

(i) said piston and cylinder assembly including a piston rod having a portion thereof received within said compression spring;

(j) said adjustment means including a collar mounted on said piston rod and engaged with the other end of said compression spring; and (k) said pillar post assembly and said piston rod being in substantially parallel offset relationship and said support means including compensating means to prevent binding between the pillar post assembly and the guide means when the piston rod is not in true parallel relationship with the pillar post assembly.

* * * * *

UNITED STATES PATENT AND TRADEMARK OFFICE
CERTIFICATE OF CORRECTION

PATENT NO. : 5,381,713
DATED : Quinn C. Smith
INVENTOR(S) : January 17, 1995

It is certified that error appears in the above-indentified patent and that said Letters Patent is hereby corrected as shown below:

In Column 5, line 4, delete "106".

In Column 5, line 6, after "glass", insert --106--.

In Column 6, line 19, change "106" to --106'--.

In Column 6, line 22, change "106" to --106'--.

In Column 8, lines 12-14, delete "*Although this claim has not been amended, we are repeating the claim in this amendment for continuity purposes".

Signed and Sealed this

Second Day of May, 1995

Attest:

BRUCE LEHMAN

Attesting Officer

Commissioner of Patents and Trademarks